(12) United States Patent
Doyle, Sr. et al.

(10) Patent No.: US 8,314,965 B2
(45) Date of Patent: Nov. 20, 2012

(54) PATROL DEVICE FIELD INSTALLATION NOTIFICATION METHOD AND SYSTEM

(75) Inventors: Daniel M. Doyle, Sr., Belleair, FL (US); Marvin Scaff, Tampa, FL (US)

(73) Assignee: Emerge Print Management, LLC, Tampa, FL (US)

( * ) Notice: Subject to any disclaimer, the term of this patent is extended or adjusted under 35 U.S.C. 154(b) by 32 days.

(21) Appl. No.: 13/087,525

(22) Filed: Apr. 15, 2011

(65) Prior Publication Data

US 2011/0228332 A1 Sep. 22, 2011

Related U.S. Application Data

(63) Continuation-in-part of application No. 12/726,979, filed on Mar. 18, 2010.

(51) Int. Cl.
*G06F 3/12* (2006.01)
*G06F 15/177* (2006.01)
*G06F 15/173* (2006.01)
*G06K 15/00* (2006.01)

(52) U.S. Cl. ............ 358/1.15; 358/1.13; 358/1.14; 709/220; 709/222; 709/224; 709/226

(58) Field of Classification Search ........ 358/1.13–1.15; 705/28; 709/220, 222, 224, 226
See application file for complete search history.

(56) References Cited

U.S. PATENT DOCUMENTS

| | | | |
|---|---|---|---|
| 5,214,772 A | 5/1993 | Weinberger et al. |
| 5,216,461 A | 6/1993 | Maekawa et al. |
| 5,220,380 A | 6/1993 | Hirata et al. |
| 5,224,157 A | 6/1993 | Yamada et al. |
| 5,243,382 A | 9/1993 | Takano et al. |
| 5,257,069 A | 10/1993 | Hirata et al. |
| 5,270,775 A | 12/1993 | Suzuki |
| 5,282,127 A | 1/1994 | Mii |
| 5,293,196 A | 3/1994 | Kaneko et al. |
| 5,300,980 A | 4/1994 | Maekawa et al. |
| 5,305,055 A | 4/1994 | Ebner et al. |
| 5,305,199 A | 4/1994 | Lobiondo et al. |
| 5,335,048 A | 8/1994 | Takano et al. |
| 5,339,168 A | 8/1994 | Evanitsky et al. |
| 5,347,346 A | 9/1994 | Shimizu et al. |
| 5,361,265 A | 11/1994 | Weinberger et al. |
| 5,365,310 A | 11/1994 | Jenkins et al. |
| 5,369,471 A | 11/1994 | Yamada |
| 5,373,349 A | 12/1994 | Ito |
| 5,384,622 A | 1/1995 | Hirata et al. |

(Continued)

FOREIGN PATENT DOCUMENTS

EP 1703674 9/2006

(Continued)

*Primary Examiner* — Twyler Haskins
*Assistant Examiner* — Jonathan Beckley
(74) *Attorney, Agent, or Firm* — Gray Robinson, P.A.

(57) ABSTRACT

A method for installing a print monitor device and notifying an installer after the print monitor device is installed. In one aspect of the method, a print monitor device is associated with a customer location, installed at the customer location, and then the print monitor device is registered in a centralized repository. In another aspect, after the print monitor device is registered, a notification is sent to an installer. In another aspect, the notification is a message which includes information about the print monitor device and the devices the print monitor device has discovered and is monitoring in a customer location.

4 Claims, 6 Drawing Sheets

U.S. PATENT DOCUMENTS

| | | | |
|---|---|---|---|
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,446,522 A | 8/1995 | Tahara et al. |
| 5,459,552 A | 10/1995 | Ohira |
| 5,488,454 A | 1/1996 | Fukada et al. |
| 5,491,535 A | 2/1996 | Hirata et al. |
| 5,493,364 A | 2/1996 | Kuroyanagi et al. |
| 5,543,892 A | 8/1996 | Hirata et al. |
| 5,548,376 A | 8/1996 | Kikuno |
| 5,555,191 A | 9/1996 | Hripcsak |
| 5,561,501 A | 10/1996 | Honma |
| 5,594,529 A | 1/1997 | Yamashita et al. |
| 5,600,403 A | 2/1997 | Inoo |
| 5,603,060 A | 2/1997 | Weinberger et al. |
| 5,619,024 A | 4/1997 | Kolls |
| 5,631,724 A | 5/1997 | Sawada et al. |
| 5,636,008 A | 6/1997 | Lobiondo et al. |
| 5,673,190 A | 9/1997 | Kahleck et al. |
| 5,677,775 A | 10/1997 | Yamaguchi et al. |
| 5,694,528 A | 12/1997 | Hube |
| 5,708,908 A | 1/1998 | Hirata et al. |
| 5,708,909 A | 1/1998 | Yamashita et al. |
| 5,752,125 A | 5/1998 | Yamashita et al. |
| 5,752,128 A | 5/1998 | Yamashita |
| 5,787,149 A | 7/1998 | Yousefi et al. |
| 5,787,278 A | 7/1998 | Barton et al. |
| 5,801,964 A | 9/1998 | McCarthy |
| 5,812,874 A | 9/1998 | Yamashita et al. |
| 5,822,221 A | 10/1998 | Groenteman |
| 5,844,550 A | 12/1998 | Trainor et al. |
| 5,873,009 A | 2/1999 | Yamashita et al. |
| 5,890,029 A | 3/1999 | Hirata et al. |
| 5,894,416 A | 4/1999 | Kuroyanagi |
| 5,897,235 A | 4/1999 | Honma |
| 5,911,095 A | 6/1999 | Atsumi et al. |
| 5,933,675 A | 8/1999 | Sawada et al. |
| 5,956,698 A | 9/1999 | Lacheze et al. |
| 6,006,045 A | 12/1999 | Miyawaki |
| 6,009,284 A | 12/1999 | Weinberger et al. |
| 6,031,964 A | 2/2000 | Anderson |
| 6,064,915 A | 5/2000 | Kaneko et al. |
| 6,091,915 A | 7/2000 | Takagishi |
| 6,108,492 A | 8/2000 | Miyachi |
| 6,112,035 A | 8/2000 | Kuroyanagi et al. |
| 6,119,934 A | 9/2000 | Kolls |
| 6,122,463 A | 9/2000 | Nagatani |
| 6,152,365 A | 11/2000 | Kolls |
| 6,181,331 B1 | 1/2001 | Trainor et al. |
| 6,282,383 B1 | 8/2001 | Weinberger et al. |
| 6,310,692 B1 | 10/2001 | Fan et al. |
| 6,430,711 B1 | 8/2002 | Sekizawa |
| 6,457,038 B1 | 9/2002 | Defossé |
| 6,601,159 B1 | 7/2003 | Smith et al. |
| 6,604,212 B2 | 8/2003 | Sekizawa |
| 6,681,349 B2 | 1/2004 | Sekizawa |
| 6,710,893 B1 | 3/2004 | Hou et al. |
| 6,757,714 B1 | 6/2004 | Hansen |
| 6,925,335 B2 | 8/2005 | May et al. |
| 7,010,502 B1 | 3/2006 | Hoshizawa et al. |
| 7,010,594 B2 | 3/2006 | Defossé |
| 7,013,337 B2 | 3/2006 | Defossé et al. |
| 7,020,680 B2 | 3/2006 | Defossé |
| 7,117,239 B1 | 10/2006 | Hansen |
| 7,139,616 B2 | 11/2006 | May et al. |
| 7,149,792 B1 | 12/2006 | Hansen et al. |
| 7,164,884 B2 | 1/2007 | Defossé et al. |
| 7,167,892 B2 | 1/2007 | Defossé et al. |
| 7,171,451 B2 | 1/2007 | Defossé |
| 7,178,149 B2 | 2/2007 | Hansen |
| 7,181,501 B2 | 2/2007 | Defossé |
| 7,185,014 B1 | 2/2007 | Hansen |
| 7,190,478 B2 * | 3/2007 | Caffary et al. .............. 358/1.15 |
| 7,334,520 B2 | 2/2008 | Geissler et al. |
| 7,383,359 B2 | 6/2008 | Motoyama et al. |
| 7,383,474 B2 | 6/2008 | Sekizawa |
| 7,433,607 B2 | 10/2008 | Thomas |
| 7,519,000 B2 | 4/2009 | Caveny et al. |
| 7,577,996 B1 | 8/2009 | Merchant et al. |
| 7,650,519 B1 * | 1/2010 | Hobbs et al. ................. 713/300 |
| 7,752,472 B2 * | 7/2010 | Diab et al. ................... 713/310 |
| 2003/0174356 A1 | 9/2003 | Cherry et al. |
| 2004/0019671 A1 | 1/2004 | Metz |
| 2004/0252329 A1 | 12/2004 | Sorenson |
| 2005/0097198 A1 * | 5/2005 | Getler et al. ................. 709/223 |
| 2005/0286068 A1 | 12/2005 | Johnson et al. |
| 2006/0288101 A1 * | 12/2006 | Mastrodonato et al. ...... 709/224 |
| 2007/0273922 A1 | 11/2007 | Matsugashita |
| 2008/0025008 A1 | 1/2008 | Kochis et al. |
| 2008/0037057 A1 | 2/2008 | Caffary, Jr. |
| 2008/0259103 A1 | 10/2008 | Lapstun et al. |
| 2008/0304095 A1 | 12/2008 | Saito |
| 2008/0309966 A1 | 12/2008 | Scaff |
| 2008/0317021 A1 * | 12/2008 | Ives et al. .................... 370/389 |
| 2008/0320099 A1 | 12/2008 | Bahn et al. |
| 2009/0147299 A1 | 6/2009 | Tetu |
| 2010/0235487 A1 * | 9/2010 | Guthery ...................... 709/223 |

FOREIGN PATENT DOCUMENTS

| | | |
|---|---|---|
| JP | 2001/265546 | 9/2001 |
| JP | 2007/114853 | 5/2007 |
| JP | 2007/279834 | 10/2007 |

* cited by examiner

1a

1b

PATROL DEVICE FIELD INSTALLATION NOTIFICATION METHOD AND SYSTEM

RELATED APPLICATION DATA

This application is a continuation-in-part of co-pending and commonly-owned U.S. patent application Ser. No. 12/726,979 entitled "Field Metering Patrol System and Method for Metering and Monitoring Printers," filed on Mar. 18, 2010, the disclosure of which is incorporated herein in its entirety by reference.

BACKGROUND OF THE INVENTION

1. Field of the Invention

This disclosure relates to a standalone apparatus and method for monitoring printers within an enterprise and for reporting the monitored information to a centralized repository. More specifically, this disclosure relates to a method for installing a stand alone apparatus for monitoring printers within an enterprise and then notifying an installer concerning the installation.

2. Description of the Background Art

Computer networks typically include peripherals, such as printers, connected to the computer systems. Measures currently exist for monitoring and reporting on the status and performance of those systems. For example, U.S. patent application Ser. No. 11/812,017, owned by the applicant, discloses an apparatus and method for discovering printers within an enterprise. That system discloses an apparatus and methods for discovering printers in a network setting, monitoring those printers for things such as print counts and service requirements. That system allows for accurate service of all the printers in an enterprise by allowing discovery of networked printers as well as non-networked printers.

These systems, while capable of monitoring an enterprise's printing resources, are typically software systems that are installed on existing workstations or laptops. Alternatively, enterprises are required to acquire, maintain and service separate workstations that can run the printer management software. This creates problems when those separate systems are disabled for different reasons. For instance, where the printer monitor software is installed on a workstation, that workstation needs to be left on or otherwise enabled to function. If the workstation is shut down overnight (for instance, when the primary user of the workstation goes home), it is unable to perform its printer monitoring tasks during this period of inoperability.

Furthermore, a tremendous amount of human interaction is involved in installing and configuring these print monitors. This can include assigning numerous field representatives to regularly visit client locations to install and maintain the necessary equipment. These representatives generally spend a large amount of time at the customer location configuring and monitoring the installation of the print monitors. As the number of customer sites to visit increases, and the complexity of the networks to be monitored increases, the costs in both time and money increase in ensuring this installation process works smoothly.

What is needed, therefore, is a method for installing print monitors programmatically within an enterprise. This method would further benefit by automatically detecting and scanning the network to which the print monitor is connected, authenticating the print monitor, and reporting its successful installation (or problems) to a centralized database. This method would further benefit from then notifying the installer of successful installation or problems that arose.

The foregoing has outlined some of the pertinent objects of the disclosure. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

According to one embodiment of the present disclosure, a method for installing a standalone, networked attached printer device monitor is disclosed. In one aspect of the method, a print monitor device is registered in a central repository and is then installed at a customer location. In another aspect, during installation, the print monitor will discover various network characteristics, including printers attached to the network. In another aspect, the print monitor will be registered in the central repository after it is installed. In another aspect, an installer will be notified after the print monitor is installed.

An advantage of one embodiment of the present disclosure may be the ability to install a print monitor whereby the installation does not need to be attended by an installer.

Another advantage of one embodiment of the present disclosure may be to notify an installer after installation of a print monitor.

Various other embodiments of the invention may have none, some, or all of the advantages discussed herein. Other technical advantages of the present disclosure will be readily apparent to one skilled in the art.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3a depicts another embodiment of an apparatus described in the present disclosure.

Similar reference characters refer to similar parts throughout the several views of the drawings.

DETAILED DESCRIPTION OF THE PREFERRED EMBODIMENT

Figure 1:
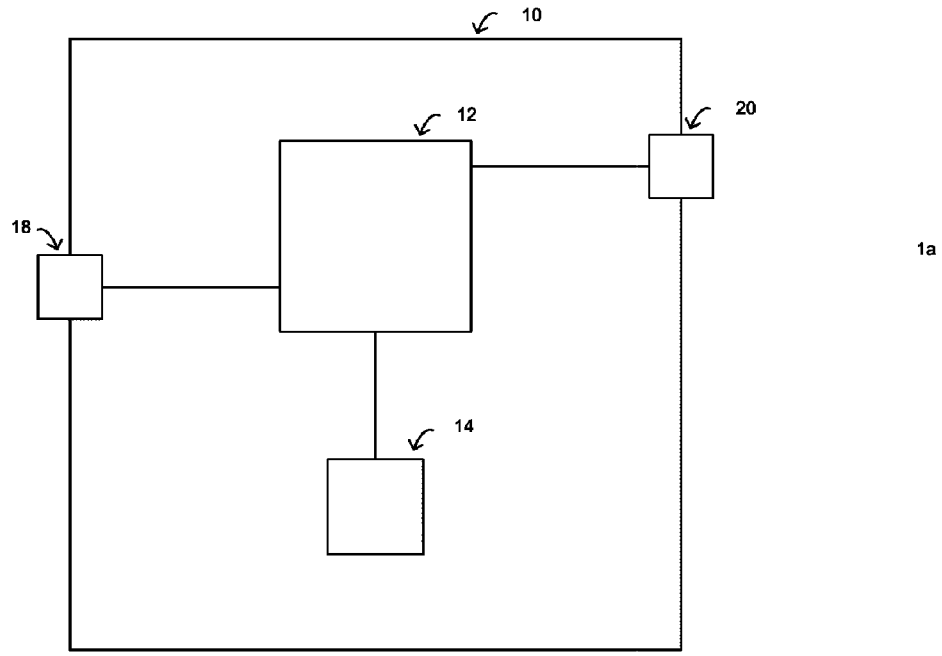
FIG. 1 illustrates preferred embodiments of an apparatus described in the present disclosure.
Figure 1:
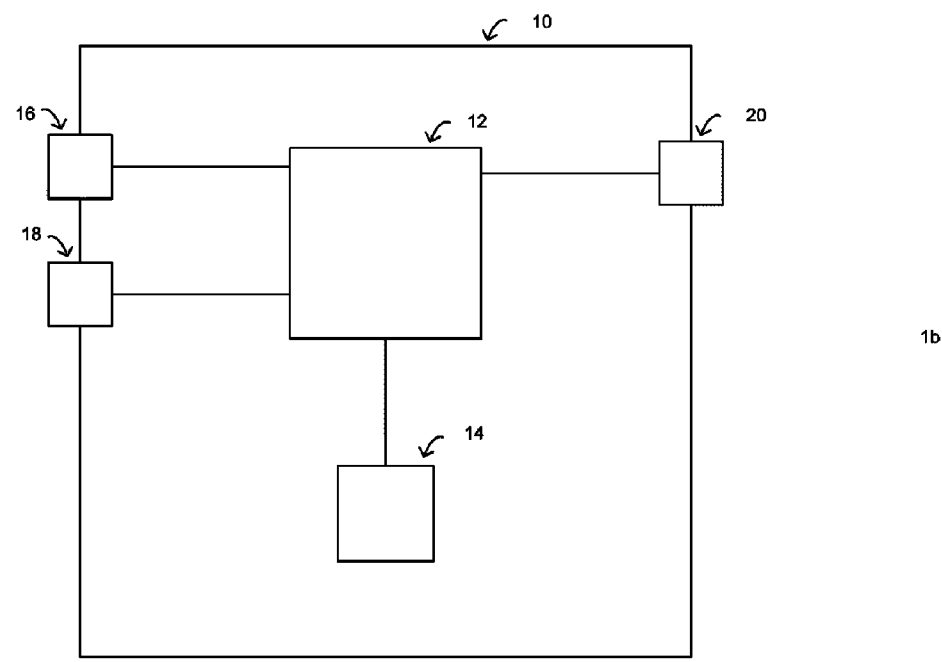

FIG. 1 consists of FIGS. 1a and 1b. FIG. 1a is a high-level diagram depicting a preferred architecture for the device 10 described herein. In a preferred embodiment, the device 10 may comprise a microcontroller 12, memory 14, a network interface 18 and status indicator 20. In an alternative embodiment, depicted in FIG. 1b, the device can also include a configuration interface 16.

The microcontroller 12 can be any computer controller capable of performing the operations as described herein. In one embodiment, the microcontroller 12 may be a 32-bit reduced instruction set computer (RISC), such as the Cortex-M3 from ARM®. These processors, and others like them, are particularly suited for use as described herein because of their low cost, lower power needs and performance capabilities.

The memory 14 can be any computer memory suitable for use as described herein. For instance, memory could be SRAM (Static Random Access Memory), DRAM (Dynamic Random Access Memory), and/or Flash memory.

In a preferred embodiment, the device 10 is configured via its network interface 18. The device 10 can run configuration software, such as a network daemon (for instance, telnetd, ftpd, or a web server) so that it can receive network connections. Thus, once the device 10 is connected to a network, a user attempting to configure the device 10 can use the network interface 18 to communicate with the device 10 to configure it.

The network interface 18 enables the device 10 to connect to a network and to receive power via the network. In a preferred embodiment, the network interface 18 is an Ethernet interface, capable of connecting the device 10 to a network via Ethernet. In a preferred embodiment, the Ethernet network can be 10/100 MBs running over copper twisted pair wires. The Ethernet network can also be a gigabit Ethernet network. Importantly, the Ethernet network must be capable of providing Power over Ethernet.

IEEE standard 802.3af-2003 describes a preferred specification for Power over Ethernet (PoE) Pursuant to this specification, devices connected to such networks can be powered using a voltage between 44-57 V DC. The standard describes two types of devices: power sourcing equipment (PSE) and powered devices (PD). The device 10 described herein is a powered device. Recent amendments to the standard (IEEE 802.3at-2009) have enhanced the standard for various benefits which may be utilized herein.

The device 10 is capable of receiving all of its electrical supply via the network interface 18. As such, the device 10 can be operated in a set-it and forget-it manner, whereby the device 10 is connected to a network via the network interface 18, without need for any other connection for the device to operate properly.

In an alternative embodiment, the device 10 includes a configuration interface 16. The configuration interface 16 may be used for connecting the device 10 to other computer resources for configuration operations and the like. In one preferred embodiment, the configuration interface is a Universal Serial Bus (USB) interface.

The device 10 may also include status indicator 20. The status indicator 20 may be an LED or a plurality of LEDs capable of displaying different information to an observer based, for instance, on the color of the LED. For example, in one embodiment, an LED status indicator 20 may display a first color indicating it has successfully connected to the network, a second color indicating it has successfully connected to the centralized repository (discussed below), a third color indicating that it is properly receiving power via the Ethernet interface 18, and a fourth color indicating a problem. As would be appreciated by one of skill in the art, any other combination of information could be displayed. In another embodiment, the status indicator 20 may be a LCD display or any other component capable of displaying status information to an observer.

The device 10 is operated simply by plugging it into the network via the network interface 18. Once plugged in, the device 10 preferably verifies that it is receiving power. The device 10 can display a status in the status indicator 20 informing the operator whether or not the power supply is proper. The device 10 next determines (and informs the operator via the status indicator 20) whether it can receive an IP address in the network. In a preferred embodiment, the device 10 requests an IP address via the Dynamic Host Configuration Protocol, and is assigned an IP address by a computer responsible for assigning such addresses. Alternatively, the device 10 can be configured to use a static IP address.

Once the device 10 has networking capabilities, the device verifies that it can communicate with the centralized repository 30. Preferably, the communication between the device 10 and centralized repository 30 requires the device 10 to first authenticate itself with the centralized repository 30. For instance, the centralized repository 30 could maintain a list of approved devices 10. This list of approved devices 10 could be in the form of a list of pre-selected Media Access Control (MAC) addresses that are approved to communicate with the centralized repository 30. Any other suitable authentication mechanism would suffice. As would be evident to one of skill in the art, the communication between the device 10 and centralized repository 30 would preferably be a secured communication, such as an encrypted communication. The device 10 could also use the status indicator 20 to inform the operator whether or not it could connect to the centralized repository 30.

Figure 2:
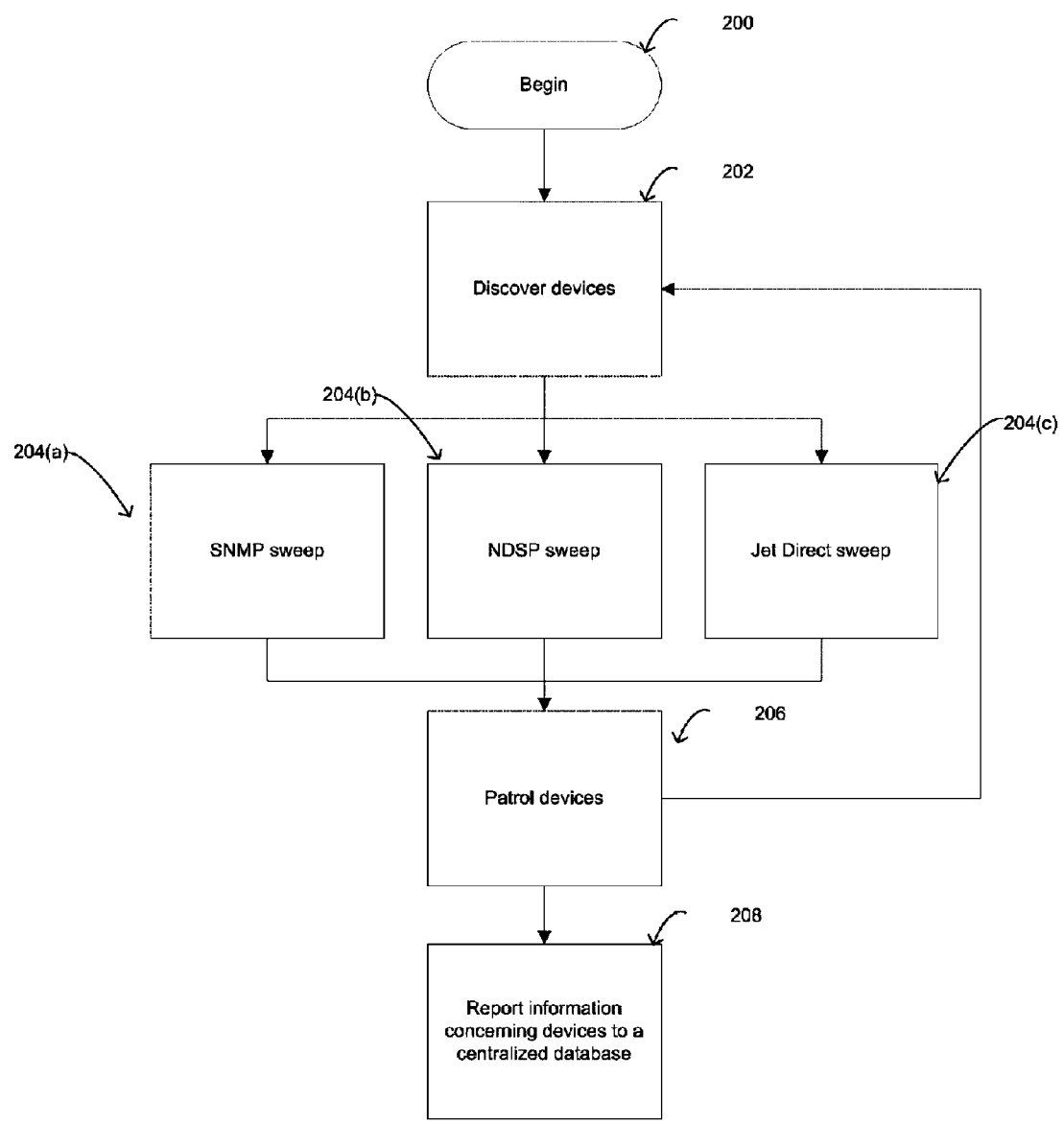
FIG. 2 illustrates steps implemented in an embodiment of the present disclosure.
Figure 3:
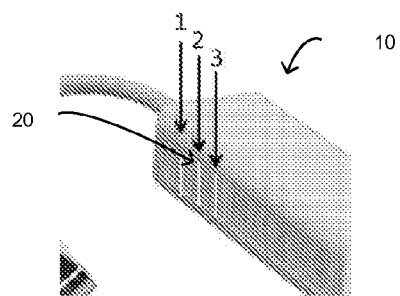
FIG. 3 depicts an embodiment of an apparatus described in the present disclosure.

Turning to FIG. 2, the device's 10 method of operation is described. In a preferred embodiment, the device 10 is utilized for monitoring printing devices (i.e. printers connected directly to a network, as well as printers not connected to the network). As such, the discussion below is in terms of discovering, monitoring and reporting on printing devices, but the device 10 is also envisioned to be utilized with other network-connectable devices.

Once connected to the network, the device 10 begins searching for printers to monitor as depicted at step 202. As shown, this search can be done in three different passes. First, the device 10 can perform a scan according to the Simple Network Monitoring Protocol (SNMP), shown at step 204(a). During this step, the SNMP scan obtains all available IP addresses for each printer attached to the network. Additionally, the scan can collect printer-related information, such as a print count associated with the printer, and other information. The SNMP scan enables the discovery process to obtain information for the majority of printers on the network, and enables the discovery process to collect complete Management Information Base (MIB) information on those printers.

When the device 10 encounters a printer device that the device 10 is not familiar with, it can contact the central repository 30 to acquire an appropriate MIB for that new printer device. The device 10 can then store this information (for instance, which printers exist on the network) to use later in patrolling these printers (discussed below) for gathering data pertaining to the discovered printers.

As a further scan step 204(*b*), a Non-Shared Desktop Printer (NDSP) scan can be performed. This is a sweep of all IP addresses for NSDP agents. The device 10, during this discovery phase, can receive and interpret the information provided by the NSDP agents it discovers on the network to determine which printers the responding devices interact with. The device 10 can then store this information along with (or separately from) the information gathered through the SNMP scan.

As another scan step 204(*c*), the device 10 can perform a Jet Direct sweep of all IP addresses to harvest IP addresses where printers can be located. Again, this information can be stored by the device 10 for later patrolling.

These scans can be performed sequentially or in parallel. Additionally, other scans are possible and considered within the scope of this disclosure. In a preferred embodiment utilizing sequential searching, the SNMP scan 204(*a*) is performed first because it can be the most effective scan option. The NDSP scan 204(*b*) would preferably be next, as the majority of printers that are not discovered using an SNMP scan are non-shared desktop printers, which may be revealed by an NDSP scan.

Once the printer scan begins, and at least a single printer is discovered, the device 10 can begin to patrol the devices. During this patrolling step 206, the device 10 can monitor various criteria of the discovered printers. For instance, the device 10 can periodically poll the discovered printers to gather print counts information, or gather service-related information (such as toner level). This patrolling process can begin while the device 10 continues to discover additional printers, or the patrolling process can begin after the printer discovery process ends.

Figure 4:
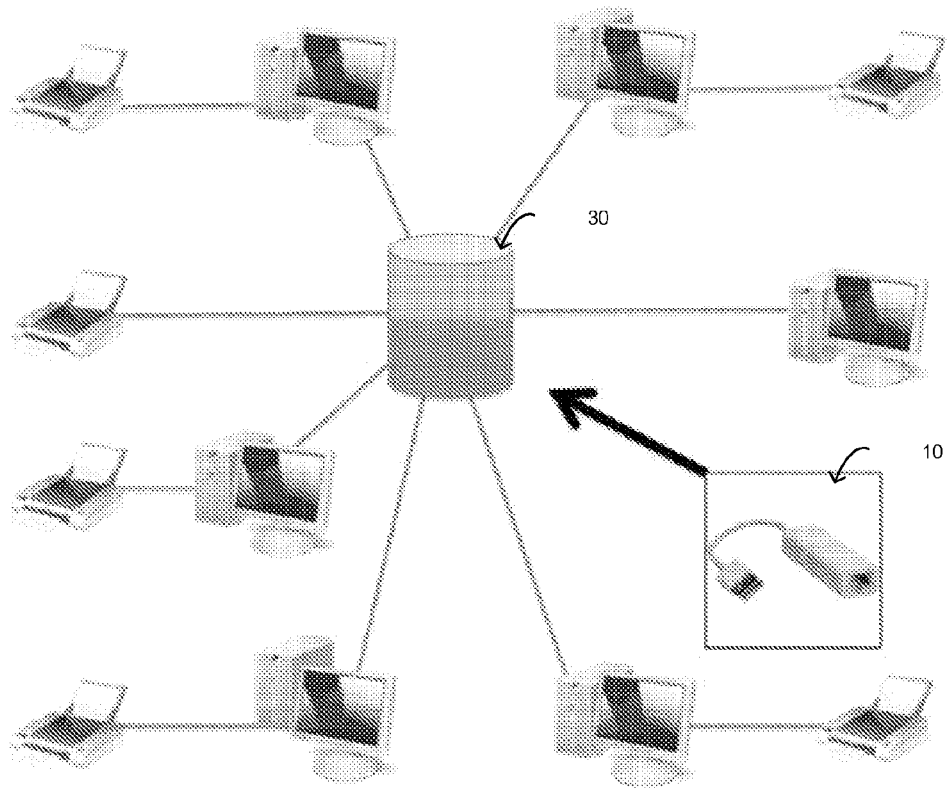
FIG. 4 illustrates an embodiment of a network of printers utilized in combination with the present disclosure.
Figure 5:
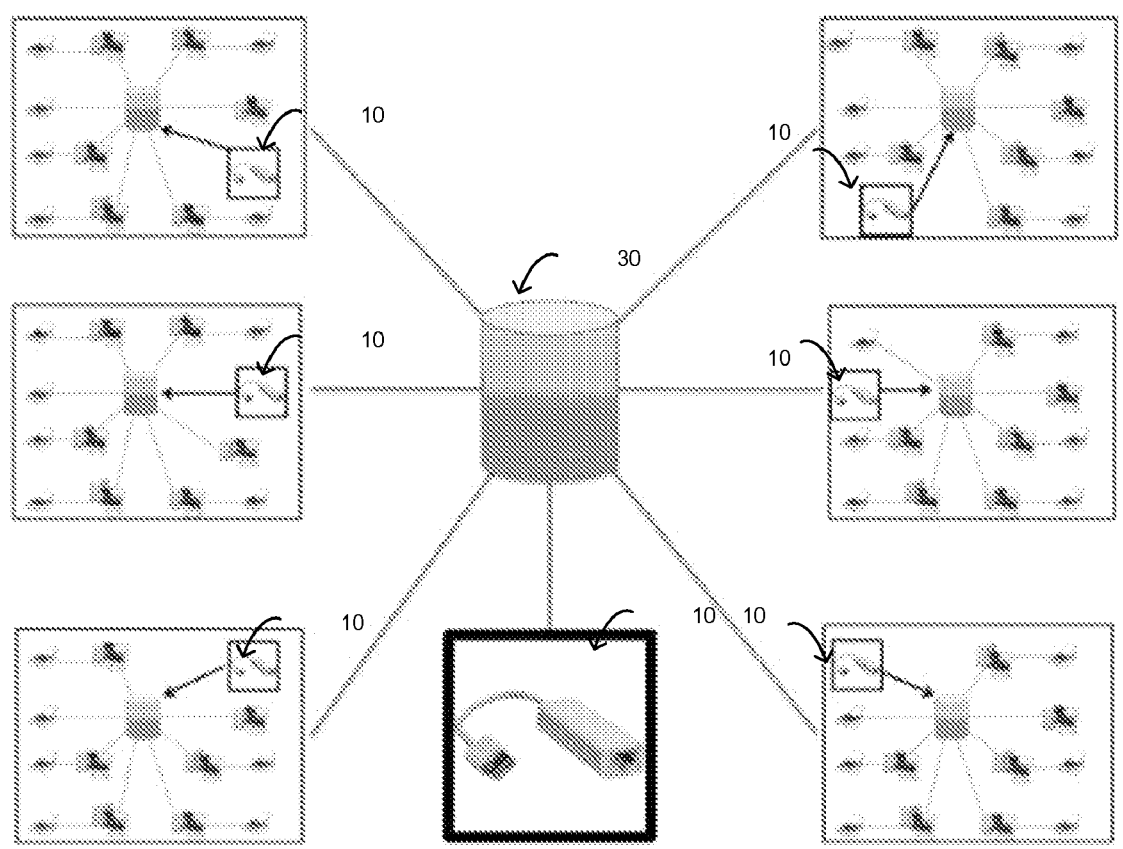
FIG. 5 illustrates an embodiment of a network of printers utilized in combination with the present disclosure.

The device 10 next reports the gathered information to a centralized repository 30, as depicted in FIGS. 4 and 5. The information stored in the centralized repository 30 can be mined in any fashion deemed appropriate. In one embodiment, the centralized repository 30 is individualized to the particular enterprise or individual using the device 10. In another embodiment, the centralized repository 30 is shared by a number of individuals and enterprises. In an example of such an embodiment an entity charged with servicing a wide variety of printer devices amongst a number of clients could install devices 10 at the respective client sites and maintain a centralized repository 30 which the devices 10 each report back to. Thus, the entity charged with servicing the printer devices can monitor the performance of the deployed printers, as well as handle other tasks such as billing for printer usage.

As shown in FIG. 2, the device 10 can re-initiate the discovery process 202 at any time in order to maintain a current view of the network topology. In one embodiment, the device 10 performs the discovery process 202 on set intervals, such as once a day. In another embodiment, the device 10 performs the discovery process 202 upon receiving an instruction to do so.

Additionally, because of its limited components, and thus limited cost, the device 10 can be utilized in large enterprises with hundreds or thousands of printer devices as well as small enterprises with as little as a single printer device that needs monitoring.

Figure 6:
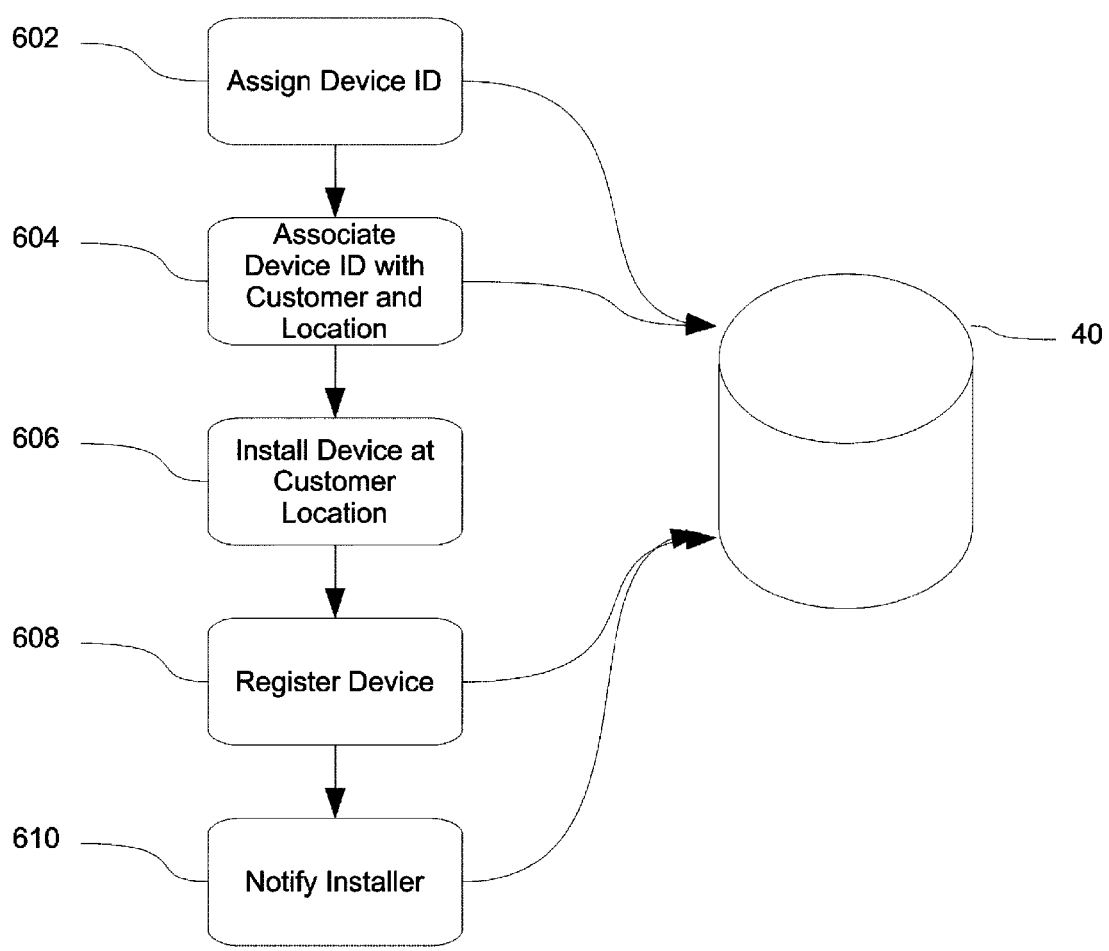
FIG. 6 illustrates steps which may be implemented in an embodiment of the present disclosure.

Turning to FIG. 6, a method is disclosed for installing a print monitor and notifying an installer of the installation. The method begins at step 602, wherein a device id is assigned to each device 10. This device id is preferably a unique id which may be used to specifically identify the device 10. In one embodiment, the device id is associated with the unique MAC address of the network interface 18 of the device 10.

The device id may also be mapped or associated with an installer 44. This association or mapping is preferably stored in a database 40. The database 40 may be the centralized repository 30, or any other database. This database 40 can be any system for storing information, and is preferably a relational database.

Next, at step 604, the device id is associated with a customer 46. Additionally, the device id may be associated with a customer location. This location may be any geoindicator, including the location of the customer's facility, or a location within the facility (such as accounting department, HR department, etc.). As with the previous associations, this mapping is preferably stored in the database 40.

At step 606, the device 10 is installed at the customer location. In one embodiment, the device 10 may be installed by shipping the device 10 to the customer so that the customer may install it herself. In another embodiment, the installer 42 would install the device 10 at the customer's location.

During the installation, the device 10 will perform a number of steps as discussed in detail above. Once the device 10 is installed (or encounters a failure during installation), it is registered with the database 40. The device 10 may also upload to the database 40 the results of a scan of the network to which it has been attached and any other information the device 10 has gathered.

Once the device 10 has been registered, the installer 44 may be notified. This notification may be in any format, but is preferably by way of an email, short message service, telephone call, or other messaging protocol. This notification may inform the installer 44 whether or not the installation succeeded, as well as information gathered by the device 10 during installation. This information may include, for instance, the device 10 id, the IP address it has been assigned, network characteristics and information, printing devices discovered on the network, the customer information and location, and any other information.

Figure 7:
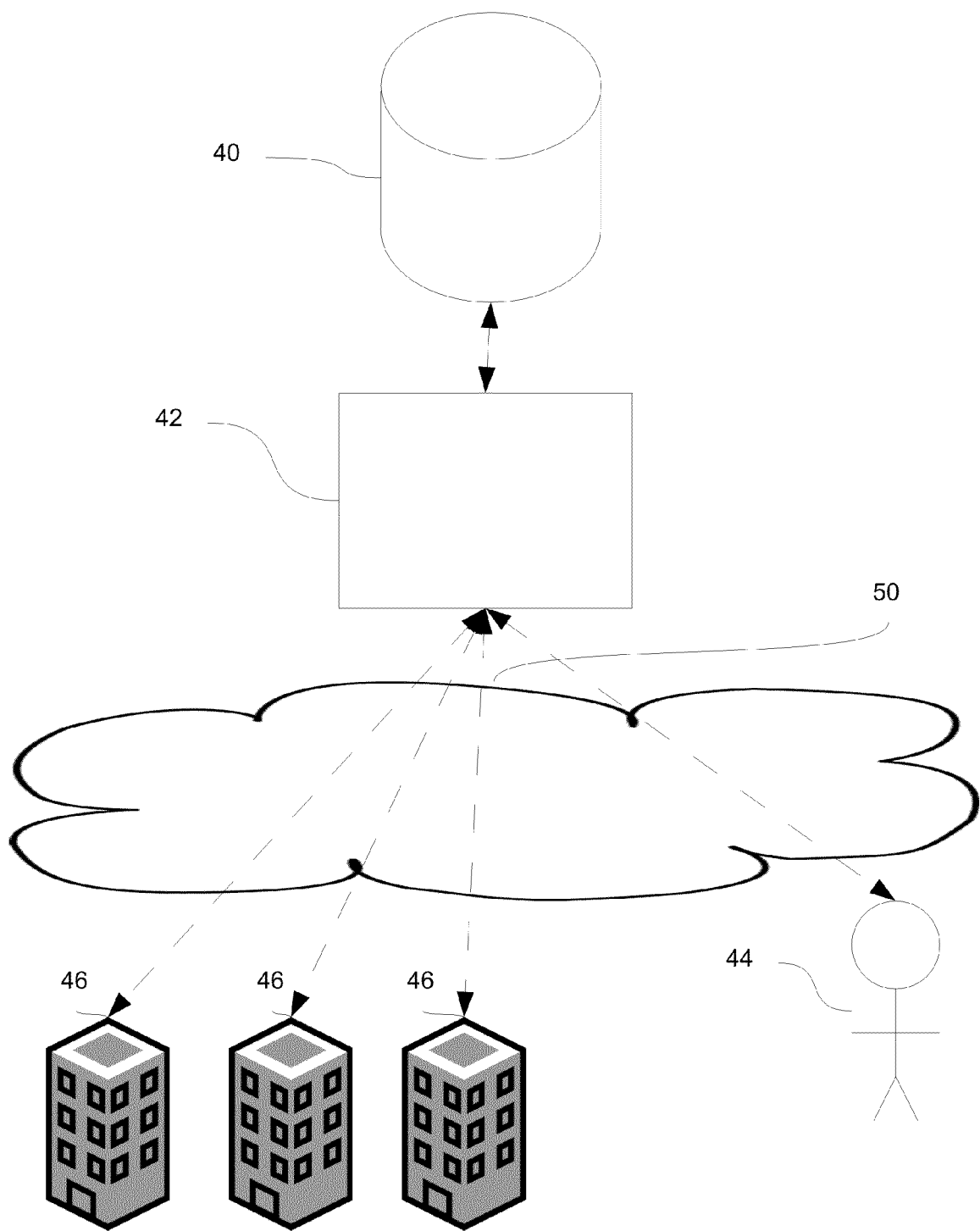
FIG. 7 illustrates a system in accordance with an embodiment of the present disclosure.

FIG. 7 illustrates a system in accordance with one embodiment of the present disclosure. The system 100 may include a database 40 and a processor 42. The system 100 can be implemented on one or more computing systems, which can include a personal computer, a workstation, a network computer, a hand held device, or any other computing system. Further, the system 100 can be written as a software program in any appropriate computer language.

The processor 42 may communicate with the database 40 via any communication path, such as a bus or a network. The processor 42 can be any computer processing unit, and could be a single central processing unit, or a number of processing units configured to operate either in sequence or in parallel. The processor 42 can be configured to execute software processes which implement the steps disclosed herein.

As would be understood to one of skill in the art, the system 100 would also include a memory capable of storing the steps necessary for the processor 42 to implement the steps disclosed herein. This memory could be in the form of memory resident within the processor 42 or in the faun of standalone memory coupled to the processor 42 via a communication path, such as a bus or a network.

The processor 42 is also communicatively connected to a network 50. In a preferred embodiment, the network 50 is the internet. The system 100 may also be used with a private network, such as a LAN or WAN. The system 100 can utilize a wired network, or a wireless network.

The processor 42 would communicate with a plurality of print monitor devices 10 installed at customer locations 46. In accordance with an embodiment of the disclosure discussed above, the system 100 would first store information concerning the print monitor devices 10 and the respective client locations 46. This information would preferably be stored in the database 40.

After each print monitor device 10 was installed, and performed its initial scan, the print monitor device 10 would communicate with the processor 42 over the network 50. The processor 42 would then store the appropriate information concerning the print monitor 10 in the database 40. After the print monitor 10 is installed, the processor 42 would then notify an installer 44.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for installing a patrol device for monitoring printers on a powered network, the method comprising the steps of:

assigning the patrol device a device ID and storing the device ID in a database wherein the patrol device comprises:
 a processing unit;
 a status indicator interconnected to the processing unit;
 an Ethernet network interface interconnected to the processing unit wherein the Ethernet network interface is configured to receive power over the network to power the patrol device via Power over Ethernet;
 the processing unit including a memory for storing information about the printers on the powered network, the processing unit including:
  a printer discovery engine for discovering a plurality of printers on the network;
  a printer patrol engine for patrolling the discovered plurality of printers; and
  a reporting engine for reporting patrolling information obtained by the printer patrol engine to the database; and
 a standalone housing;
 wherein the status indicator, the processing unit, and the Ethernet network interface being mounted within the standalone housing;

associating the patrol device with an installer, and storing the association in the database;

mapping the patrol device to a customer location and storing the mapping in the database;

installing the patrol device at the customer location whereby the patrol device first obtains an IP address, then authenticates itself with the database, and then scans a network at the customer location to gather information about printers connected to the network;

registering the patrol device upon successful installation, whereby the patrol device notifies the database of successful installation at the customer location and the patrol device uploads the information gathered about printers connected to the network; and notifying the installer after successful installation, whereby the notification includes the IP address of the patrol device, a count of printers discovered by the patrol device, and a device ID of the patrol device.

2. The method of claim 1 wherein notifying the installer comprises sending a message to an installer.

3. The method of claim 2 wherein the message is sent as an email.

4. The method of claim 2 wherein the message is sent via SMS.

* * * * *